3,181,995
ESTERS OF THIOSTREPTON

Miklos Bodanszky and Josef Fried, Princeton, N.J., assignors to Olin Mathieson Chemical Corporation, New York, N.Y., a corporation of Virginia
No Drawing. Filed Mar. 30, 1962, Ser. No. 183,756
4 Claims. (Cl. 167—65)

This invention relates to new esters of thiostrepton, and more particularly to water-soluble half esters of thiostrepton with dicarboxylic acids.

Prior to this invention, it was known that the antibiotic thiostrepton was a potent antibacterial substance. Unfortunately, however, thiostrepton is almost insoluble in water (see U.S. Patent No. 2,982,689) and hence its applications for therapeutic purposes is limited.

It has now been found that thiostrepton will form half esters with dicarboxylic acids and that these half esters, when converted to their non-toxic salt forms, are water-soluble.

Although any dicarboxylic acid may be used in forming the half esters of thiostrepton of this invention, the preferred acids include the dicarboxylic acids of less than twelve carbon atoms, as exemplified by the alkanedioic acids (e.g., succinic acid and glutaric acid), the alkenedioic acids (e.g., maleic acid, glutaconic acid, citraconic acid and itaconic acid), the cycloalkanedicarboxylic acids, the monocyclic aryl dicarboxylic acids (e.g., phthalic acid), the aromatic heterocyclic dicarboxylic acids, and the amino, hydroxyl, halo, and nitro substituted derivatives thereof.

The half esters of this invention are prepared by intermixing thiostrepton and the dicarboxylic acid, which may be in its acyl chloride or acid anhydride (e.g., an inner anhydride) form. The reaction is preferably conducted by heating the reactants in an organic solvent (preferably an organic base such as pyridine). To prepare the desired water-soluble salts, the half ester thus formed is reacted either in situ or in a separate step with a base. Suitable bases include: inorganic bases, such as ammonium hydroxide, the alkali metal hydroxides (e.g., potassium hydroxide and sodium hydroxide), and the alkaline earth metal hydroxides; and organic bases, such as di-(lower alkyl)amines and heterocyclic amines (e.g., pyridine). The alkali metal hydroxides are preferred. In addition, the salts may be formed by reacting the half ester with a salt of the desired base with a weak acid, such as an alkali metal carbonate or an alkali metal bicarbonate (e.g., potassium bicarbonate).

The resulting salts of the half esters of a dicarboxylic acid with thiostrepton, unlike thiostrepton itself, are water-soluble compounds which possess the full antibacterial activity of thiostrepton.

The following examples illustrate the invention (all temperatures being in centigrade):

EXAMPLE 1

*Thiostrepton hemisuccinate*

Thiostrepton (2 g.) is suspended in pyridine (3 ml.) and succinic anhydride (1.5 g.) is added to the mixture, which in turn is heated to 100° and is kept at this temperature for 15 minutes. A clear solution is obtained after about 5 minutes. The reaction mixture is cooled to room temperature and then diluted with ethyl acetate (about 200 ml.). A precipitate forms, this is separated from the liquid by filtration or centrifugation and is washed with ethyl acetate (40 ml.) and finally with ether. About 1.4 g. of a product, M.P. about 200–220°, dec., with a neutr. equiv. 620–650 is obtained.

EXAMPLE 2

*Potassium salt of thiostrepton hemisuccinate*

Thiostrepton hemisuccinate (2 g.) is suspended in an aqueous solution (20 ml.) of potassium bicarbonate (320 mg.). After stirring for about half an hour the solution is filtered, the filtrate frozen and lyophylized to yield the potassium salt of thiostrepton hemisuccinate.

In a similar manner, all other half esters of this invention can be prepared by substituting the desired acyl halide or acid anhydride for the succinic anhydride in Example 1 and following the procedures of Examples 1 and 2. Moreover, if another base or basic salt is substituted for the potassium bicarbonate in the procedure of Example 2, the corresponding salt is obtained.

The invention may be variously otherwise embodied within the scope of the appended claims.

What is claimed is:

1. A compound selected from the group consisting of the half esters of dicarboxylic acids of less than twelve carbon atoms and thiostrepton, and the non-toxic, water-soluble salts thereof.
2. Thiostrepton hemisuccinate.
3. An alkali metal salt of thiostrepton hemisuccinate wherein the alkali is selected from the group consisting of sodium and potassium.
4. The potassium salt of thiostrepton hemisuccinate.

References Cited by the Examiner

UNITED STATES PATENTS

| | | | |
|---|---|---|---|
| 2,871,160 | 1/59 | Johnson | 167—77 |
| 2,982,689 | 5/61 | Donovich et al. | 167—65 |
| 3,036,120 | 5/62 | Hammer et al. | 260—485 X |
| 3,070,623 | 12/62 | Gottfried | 260—485 X |

OTHER REFERENCES

J.A.M.A., page 606, Oct. 6, 1956.
Lancet: Page 13, Advertising Section, August 10, 1957.
Vanderputte et al.: Antibiotics Annual, 1955–1956, pages 560–561.

FRANK CACCIAPAGLIA, Jr., *Primary Examiner.*